United States Patent
Maltsev et al.

(10) Patent No.: US 8,837,345 B2
(45) Date of Patent: Sep. 16, 2014

(54) WIRELESS BROADBAND SYSTEMS WITH RELAY STATIONS

(75) Inventors: Alexander Maltsev, Nizhny Novgorod (RU); Jaroslaw S. Sydir, San Jose, CA (US); Alexey Khoryaev, Dzerzhinsk (RU); Andrey Chervyakov, Nizhny Novgorod (RU); Roman Maslennikov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1251 days.

(21) Appl. No.: 12/584,331

(22) Filed: Sep. 3, 2009

(65) Prior Publication Data

US 2010/0054175 A1 Mar. 4, 2010

Related U.S. Application Data

(60) Provisional application No. 61/094,357, filed on Sep. 4, 2008.

(51) Int. Cl.
*H04B 7/14* (2006.01)
*H04W 72/04* (2009.01)
*H04B 7/26* (2006.01)
*H04L 1/18* (2006.01)
*H04W 84/04* (2009.01)
*H04L 1/00* (2006.01)

(52) U.S. Cl.
CPC ......... *H04B 7/2606* (2013.01); *H04W 72/0453* (2013.01); *H04L 1/1877* (2013.01); *H04B 7/2656* (2013.01); *H04W 84/047* (2013.01); *H04L 1/1854* (2013.01); *H04L 1/0001* (2013.01); *H04L 1/1861* (2013.01); *H04L 2001/0093* (2013.01); *H04W 72/046* (2013.01)

USPC .......................................................... 370/315

(58) Field of Classification Search
USPC .......................................................... 370/315
See application file for complete search history.

(56) References Cited

U.S. PATENT DOCUMENTS

| | | | |
|---|---|---|---|
| 7,746,822 B2 * | 6/2010 | Xue et al. | 370/328 |
| 8,218,510 B2 * | 7/2012 | Kim et al. | 370/337 |
| 8,542,760 B2 * | 9/2013 | Zhang et al. | 375/262 |
| 8,553,747 B2 * | 10/2013 | Song et al. | 375/211 |
| 2007/0153734 A1 * | 7/2007 | Lee et al. | 370/329 |
| 2008/0019423 A1 * | 1/2008 | Hu | 375/141 |
| 2008/0031182 A1 * | 2/2008 | Maheshwari et al. | 370/320 |
| 2008/0043816 A1 * | 2/2008 | Hart et al. | 375/135 |
| 2008/0045212 A1 * | 2/2008 | Kim et al. | 455/435.1 |
| 2008/0062904 A1 * | 3/2008 | Tzu-Ming | 370/312 |
| 2008/0075178 A1 * | 3/2008 | Lappetelainen et al. | 375/260 |
| 2008/0170533 A1 * | 7/2008 | Cyzs et al. | 370/315 |

(Continued)

OTHER PUBLICATIONS

Li, Qinghua et al., U.S. Appl. No. 12/317,188, filed Dec. 19, 2008 entitled Spatial Reuse Techniques With Wireless Network Relays.

*Primary Examiner* — Guang Li
(74) *Attorney, Agent, or Firm* — Schwabe, Williamson & Wyatt, P.C.

(57) ABSTRACT

In a wireless communications network using relay stations between the network controller and at least some of the subscriber stations, the total network throughput may be increased by using spatial multiplexing between the network controller and some relay stations. In networks with multiple tiers of relay stations, a relay station may dedicate some sub-channels to communicating directly with subscriber stations and dedicate other sub-channels to communicating with other downstream relay stations.

12 Claims, 6 Drawing Sheets

(56) References Cited

U.S. PATENT DOCUMENTS

| | | | |
|---|---|---|---|
| 2008/0220790 A1* | 9/2008 | Cai et al. | 455/450 |
| 2009/0003259 A1* | 1/2009 | Sundaresan et al. | 370/315 |
| 2009/0175214 A1* | 7/2009 | Sfar et al. | 370/315 |
| 2009/0201889 A1* | 8/2009 | Sundaresan et al. | 370/336 |
| 2009/0303918 A1* | 12/2009 | Ma et al. | 370/315 |
| 2010/0008283 A1* | 1/2010 | Chitrapu et al. | 370/312 |
| 2010/0284322 A1* | 11/2010 | Lim et al. | 370/315 |

* cited by examiner

WIRELESS BROADBAND SYSTEMS WITH RELAY STATIONS

CROSS REFERENCE TO RELATED APPLICATIONS

This application is related to U.S. provisional application Ser. No. 61/094,357, filed on Sep. 4, 2008, and claims priority to that filing date for all common subject matter.

BACKGROUND

Wireless communications networks can sometimes increase their geographical coverage area by using relay stations between the base station and at least some of the subscriber stations, thereby effectively extending the transmission range of those base stations and subscriber stations. However, this may not increase the effective network bandwidth, and may even decrease it, since more devices must share the available bandwidth resources and some of the transmissions are repeated by being forwarded. In particular, the bandwidth of direct communications with the base station may not increase because the bandwidth of the base station itself may be limited, which limits the total effective communications bandwidth for the entire network. These issues may become even more of a problem when multiple tiers of relay stations are used.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer readable medium may include a tangible non-transitory storage medium such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. A wireless device may comprise at least one antenna, at least one radio, and at least one processor, where the radio transmits signals through the antenna that represent data and receives signals through the antenna that represent data, while the processor may process the data to be transmitted and the data that has been received. The processor may also process other data, which is neither transmitted nor received.

The term "network controller" (NC) is used herein to describe a wireless communications device that schedules wireless communications with other devices in the network. The term "subscriber station" (SS) is used herein to describe a wireless communications device that is associated with the NC and whose communications with the NC are largely scheduled by the NC. The term "relay station" (RS) is used herein to describe a wireless communications device that relays communications between an SS and the NC, either directly, or indirectly through one or more other RS's. An SS may also be considered to be associated with the RS with which it has direct communication, rather than with the NC that controls the network. In conventional usage, the term "associated" indicates that an SS has provided sufficient information about itself that the NC is aware of the existence of the SS, and the NC and SS have agreed on enough protocols that they can communicate effectively and directly with each other. Similarly, an SS may be associated with an RS under the same conditions, and an RS may be associated with the NC or with an upstream RS under those same conditions. Other terms may be used to describe NC's, such as but not limited to "access point", "base station", "control point" (CP), etc. Other terms may be used to describe SS's, such as but not limited to mobile station (MS), STA, DEV, etc. Other terms may also be used for RS's. The terms used in this document are intended to encompass all such alternative labels for such functionally equivalent devices.

In various embodiments, an NC may use spatial multiplexing to communicate different data at the same time with multiple RS's in a first tier of RS's. Spatial multiplexing involves using directional communications to communicate different information in different directions at the same time using the same frequencies. Since spatial multiplexing may permit different RS's to receive different data at the same time on the same frequency(s), the total throughput for all communications to/from the NC may be multiplied by several times when compared with omnidirectional transmissions in which all the RS's would see the same data at the same time. The total effective throughput may be increased over the omnidirectional technique even more, since spatial multiplexing may reduce interference levels for some devices, permitting a higher data rate.

Spatial multiplexing using multiple antennas, may be accomplished in various ways, such as but not limited to 1) using multiple antennas, each of which is physically directional, and 2) using spatial division multiple access (SDMA) techniques. In SDMA, the NC has multiple antennas, each of which may be basically omnidirectional in nature. When the omnidirectional transmission from each antenna is modified in the correct way, the collective transmissions from all the antennas may combine to produce a signal that is directional, i.e., strong in one direction and weak in the other directions at the designated frequency. By careful control of the transmitted signals at each antenna, multiple such directional beams may be produced simultaneously, each carrying different data in a different direction on the same frequency. Through related techniques of signal processing, receptions may also be directional, in which the signals being received from a particular direction are perceived to be strong, while the signals received from other directions are effectively filtered out.

Although SDMA is described as a specific technique, other techniques may also be used to produce directional transmissions and/or receptions. Within this document, all such techniques are included in the terms "directional transmission", "directional reception", and "directional communication", where "communication" means transmission or reception or both. Similarly, the term 'spatial multiplexing' may be used to cover any technique for creating multiple simultaneous directional communications at the same frequency or frequencies.

Figure 1:
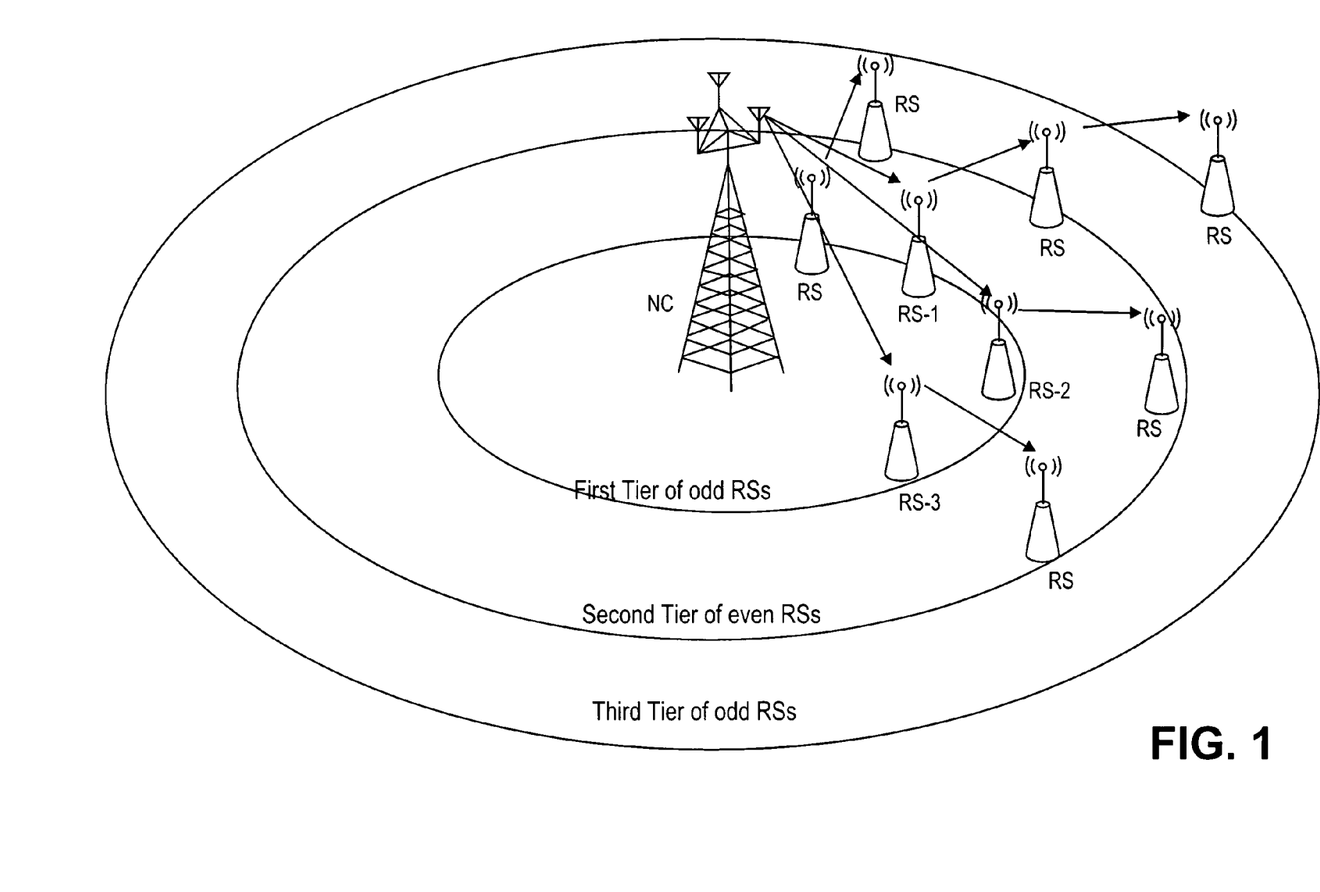
FIGS. 1 and 2 show wireless networks with multiple tiers of relay stations, according to an embodiment of the invention.

FIG. 1 shows a wireless network with multiple tiers of relay stations, according to an embodiment of the invention. Each relay station (RS) in the first tier communicates directly with the network controller (NC), while each RS in the second tier communicates directly with an RS in the first tier, each RS in the third tier communicates directly with an RS in the second tier, etc. Any feasible number of tiers may be used, including only one tier of RS's. When there is more than one tier, RS's in the first, third, fifth, etc. tiers may be referred to as odd RS's, while RS's in the second, fourth, sixth, etc., tiers may be referred to as even RS's. For simplicity of illustration, all the RS's in the same tier are shown as being the same distance from the NC (or from the next tier). But for various reasons (e.g., obstructions to the signals, geographic topology, land availability, etc.) in actual practice there may be considerable difference in this distance for RS's in the same tier.

Figure 2:
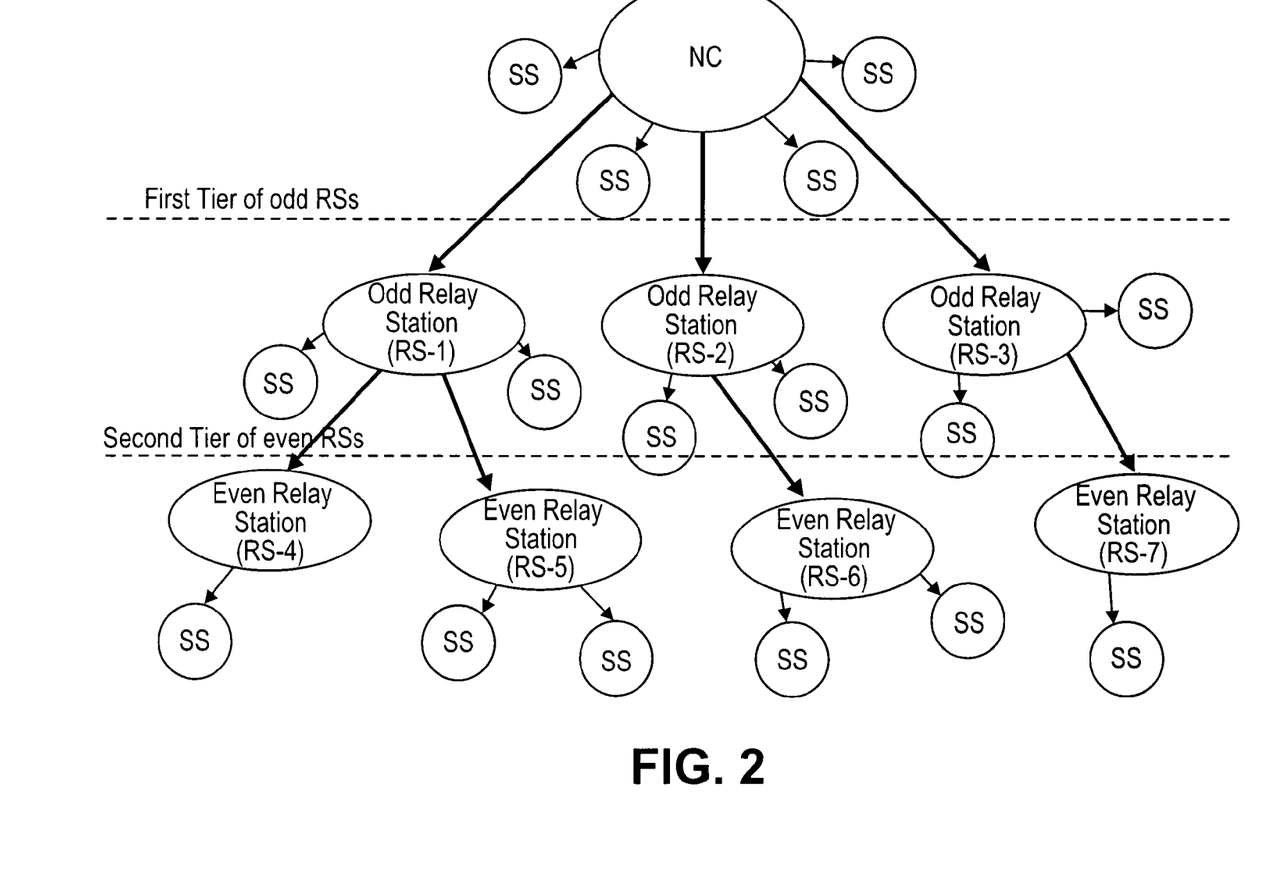

In some embodiments, any RS may communicate directly with one or more associated subscriber stations (SS), and/or the NC may also communicate directly with one or more SS's associated with it. However, any particular SS should communicate directly only with one RS or with the NC. FIG. 2 shows an example of SS's for the NC and two tiers of RS's.

As mentioned earlier, spatial multiplexing may be used to simultaneously communicate between the NC and multiple RS's in the first tier. By transmitting separate directional beams to RS-1, RS-2, and RS3 (see FIGS. 1 and 2), the NC may transmit different data to each of these relay stations simultaneously at the same frequency (or same combination of frequencies if applicable). Similarly, the NC may receive different data from each of these relay stations simultaneously at the same frequency(s) by using directional reception. Each of these directional transmissions/receptions may be referred to as a 'spatial channel'. However, since most individual devices may not transmit and receive at the same time, the NC may transmit downlink data to the first tier RS's at a different time than it receives uplink data from the first tier RS's. Similarly, a first tier RS would not receive downlink data from the NC at the same time that RS was transmitting downlink data to a second tier RS or an SS, and would not transmit uplink data to the NC at the same time that RS was receiving uplink data from a second tier RS or an SS. The NC may schedule all such communications in a manner that avoids such timing conflicts.

Figure 3:
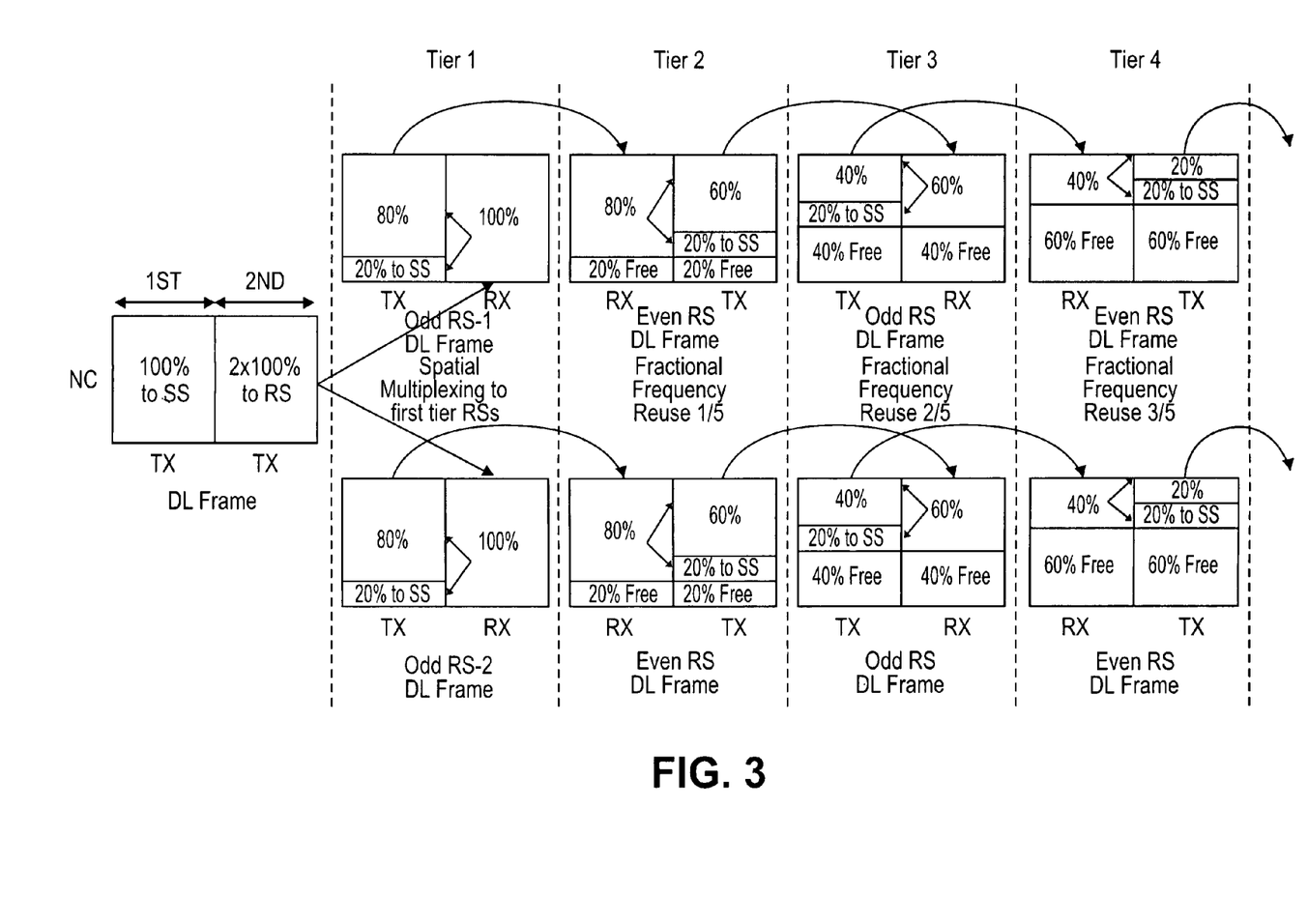
FIG. 3 shows spatial multiplexing between a network controller and two first tier relay stations, according to an embodiment of the invention.

FIG. 3 shows spatial multiplexing between a network controller and multiple first tier relay stations, according to an embodiment of the invention. Only the downlink portion of the communications is shown, but the same principles may be applied to the uplink portion. Within this figure, 'downstream' devices are those devices to the right of the referenced device (i.e., downlink data is moving downstream through the tiers), and 'upstream' devices are those devices to the left of the referenced device (i.e., uplink data is moving upstream through the tiers). In this example, the NC and eight RS's are shown, with two RS's in each of four tiers. Each device is represented by a box showing communication during two separate time periods. The first time period is shown on the left half of the box, and the second time period on the right half of the box. The first time period is the same time period for all devices in the drawing, and the second time period is likewise the same time period for all devices in the drawing. The drawing only shows a single set of two time periods, but these two time periods may be repeated at defined intervals as often as necessary. In some embodiments, each downlink frame will contain one set of these two time periods. The two time periods may or may not be adjoining in time as shown, may or may not be equal in length, and in some embodiments their length and/or timing relationship with each other may be redefined for each frame.

Since the NC is not receiving during either of these time periods (this example only shows the downlink portion), the NC may use both for downlink transmissions. In this example, the NC may transmit downstream directly to some of the SS's during the first time period, and transmit downstream to first-tier RS's during the second time period, although other embodiments may reverse this order. However, although the NC is transmitting during both time periods, for the RS's one of the time periods may be used for receiving while the other is used for transmitting. By alternating which time period is used for which function at each tier, each RS at each tier may perform useful communications during both time periods, and necessary data may be passed down through the tiers over time. For example, the odd RS's (e.g., in the first or third tiers) may be transmitting downstream to even RS's (in the second or fourth tiers) during the first time period and receiving downstream transmissions from the NC or from even RS's during the second time period. Similarly, even RS's may be receiving downstream transmissions from odd RS's during the first time period and transmitting downstream to odd RS's during the second time period. In this manner, data may be passed down through the tiers, one tier per frame, until it reaches its destination. Whenever an RS is in its transmission time period, it may also transmit to any of its associated SS's. Thus, downlink communications may be passed down from the NC through the tiers of RS's and eventually to the SS's by using alternating periods of transmission and reception at each tier.

In many networks, multiple frequencies (referred to here as sub-channels, though other terminology may also be used) may be used to convey different data at the same time. For example, in some types of communications referred to as Orthogonal Frequency Division Multiplexing (OFDM) or Orthogonal Frequency Division Multiple Access (OFDMA), the transmission may use hundreds of sub-channels at the same time, allowing efficient equalization in the frequency selective channels and transmission of different data to different users on different sub-channels. Other embodiments may use other quantities of sub-channels, such as dozens or thousands of sub-channels. The principles described here may be used for any feasible quantity of sub-channels. In the illustrated example, all the available channels (100%) may be used when the NC transmits to its associated SS's during the first time period, although other embodiments may not use some of the sub-channels for this purpose. Similarly, up to 100% of the available channels may again be used when the NC transmits to the RS's during the second time period. Since spatial multiplexing is being used to transmit in two different directions (one direction to RS-1 and another direction to RS-2 in this example), each sub-channel may also be spatially multiplexed in those two different directions, thus doubling the total amount of data that could be conveyed with a single omnidirectional transmission using the same number of sub-channels. It is important to note the difference here between spatial channels, which are based on physical direction, and sub-channels, which are based on frequency. A first spatial channel may carry multiple sub-channels simultaneously, while a second spatial channel may carry different data on the same multiple sub-channels, and do so at the same time as the first spatial channel.

After receiving their respective downlink communication from the NC, each of the first tier RS's (RS-1 and RS-2 in this example) may subsequently forward that received data to the appropriate devices. For the general case, it is assumed that each RS may have one or more SS's associated with it, and that some of the data received during the downlink portion is destined for those SS's. For example, RS-1 may transmit a portion of the received data to its associated SS's over some sub-channels, and transmit another portion to its second-tier RS's over different sub-channels at the same time. This allocation of sub-channels may be exclusive (i.e., no sub-channel is used by the first-tier RS for both SS's and second-tier RS's during the same downlink frame). Thus the relay station may transmit downlink data to its associated SS's and to its associated second-tier RS's in parallel, by using different sub-channels for each set of devices. In some embodiments the combined sub-channels for forwarding data to the SS's and RS's will be the same sub-channels used for receiving the data, but other embodiments may use more, fewer, and/or different sub-channels for transmission than for reception. In this example, it is assumed that about 20% of the sub-channels used for reception are used for transmitting data to the SS's associated with RS-1, and about 80% of those sub-channels are used for transmitting data to the second-tier RS. These percentages are for example only, and other embodiments may use different percentages. In some embodiments, the percentages may be changed for each downlink frame to accommodate the current proportions of data destined for the SS's compared with data destined for the RS's. The same assumptions are made for RS-2, although the percentages could be different for each RS and may be determined dynamically. Note: For simplicity, this example assumes that all the available sub-channels are used between the NC and the first tier RS's. In some embodiments, less than all the sub-channels may be used at this level, but the same principles at each tier may still be applied.

Since the second tier RS's may only need 80% of the available sub-channels to receive all their data, and some of those sub-channels may be used for forwarding data to the associated SS's, less than 80% of the sub-channels may be needed for forwarding data to the third tier RS's. In this example, 20% of the sub-channels are dedicated to the SS's and 60% to the third-tier RS's. Again, differ sets of sub-channels may be allocated for SS's than for RS's.

Similarly, the third tier RS's may only need 60% of the sub-channels for reception and for transmission, and only 40% for forwarding to the fourth tier RS's, etc. Since each successive downstream tier may need only a fraction of the available sub-channels, the remaining sub-channels may be unused for the communications described herein. In this example, using the percentages assumed in FIG. 3, 20% of the sub-channels are unused by the second tier, 40% by the third tier, and 60% by the fourth tier. This application of fractional frequency reuse (FFR) can be applied very effectively as each tier of RS's receives only a portion of the data received by the previous tier of RS's, and therefore needs fewer sub-channels. These unused sub-channels may be helpful in various ways, such as but not limited to: 1) reducing power consumption in the SS's by reducing some of the signal processing needed in those devices, 2) avoiding interference with neighboring networks that are using those sub-channels, 3) re-using those sub-channels for the communications described above to permit lowering the data rate in a noisy environment, 4) etc.

Figure 4:
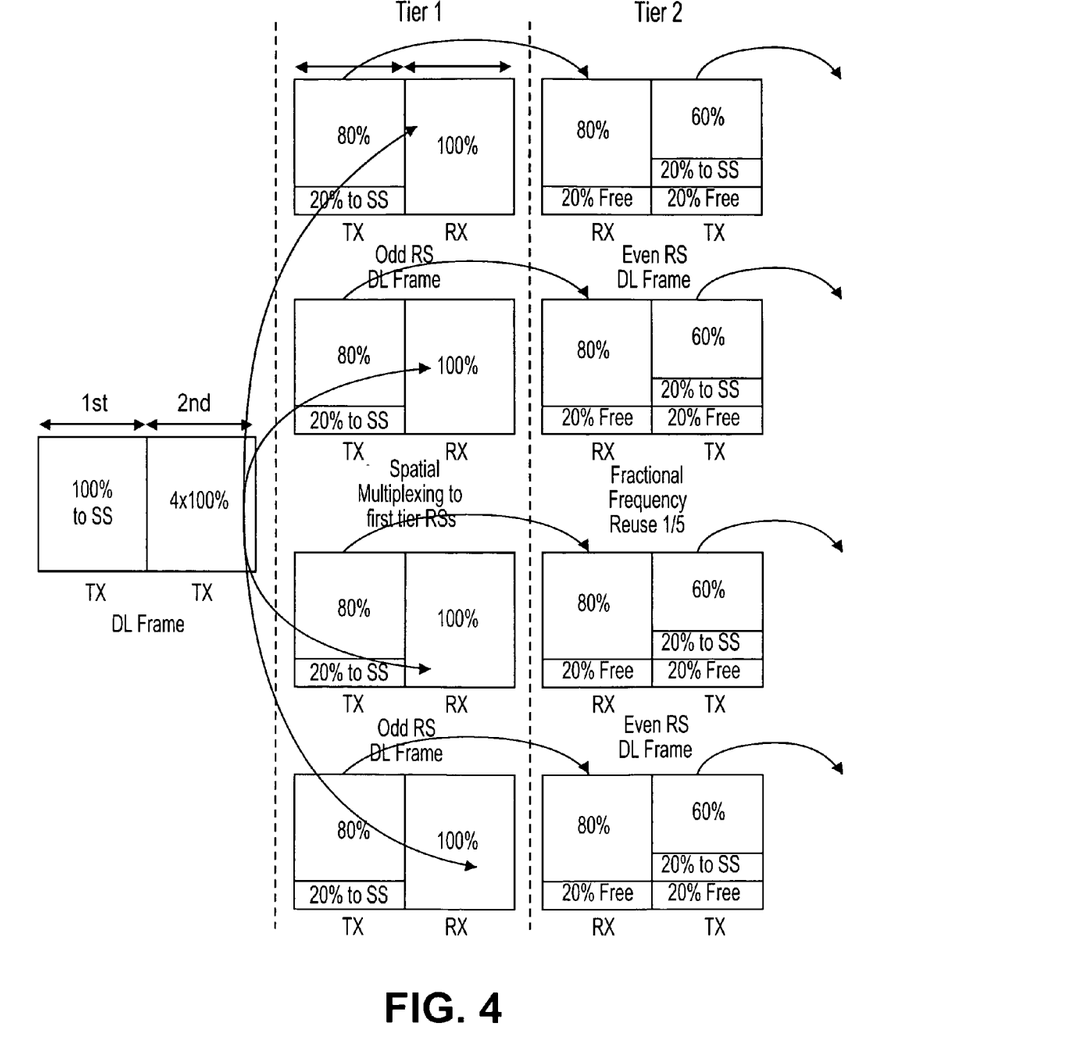
FIG. 4 shows spatial multiplexing between a network controller and four first-tier relay stations, according to an embodiment of the invention.

FIG. 4 shows spatial multiplexing between a network controller and four first-tier relay stations, according to an embodiment of the invention. The explanation of this network configuration is similar to that of FIG. 3, except that spatial multiplexing by the NC is used with four spatial channels instead of two, and the eight RS's are placed into two tiers of four RS's each instead of four tiers of two RS's each. The general concepts and example percentages may be much the same for both embodiments. The same number of devices are used in both examples. (For both FIG. 3 and FIG. 4, although each spatial stream from the NC is shown as communicating either directly or indirectly with only one RS at each tier, this is only for simplicity of explanation. In other embodiments a first tier RS may communicate directly with multiple second tier RS's, each of which may communicate directly with multiple third tier RS's, etc. However, the principles and techniques described can be easily expanded to accommodate this.)

Although the embodiments of FIG. 3 and FIG. 4 contain the same number of network devices, each configuration has certain advantages and disadvantages, which can be advantageously applied to the specific situation. For example, having four tiers of RS's permits the effective geographical range of the network to be extended much farther than would be feasible with only two tiers. On the other hand, in a congested network with many SS's, having four spatial streams at the NC may permit greater total throughput so that more total devices may be serviced. Other advantages may also be found.

The descriptions so far have focused only on downlink communications, but the same principles may be applied to uplink communications. For example, during the uplink portion of the communications, each RS may receive uplink data during one of two time periods and transmit uplink data during the other time period. Applying FIG. 3 to uplink communications, the NC may receive from its associated SS's during the first time period and receive from the first tier RS's during the second time period. This would permit RS's in the first and third tiers to receive from their downstream RS's or SS's during the first time period and transmit to the NC or second tier RS's during the second time period. Similarly, the RS's in the second or fourth tier would transmit to the first or third tier RS's during the first time period and receive from their downstream RS's or SS's during the second time period.

The allocation of sub-channels that was used in the downlink portion may be applied, in reverse, to the various tiers of RS's during uplink communications, with an RS using one set of sub-channels to receive SS uplink transmissions and another set of sub-channels to receive RS uplink transmissions at the same time. While the NC may assign 100% of the available sub-channels to receiving from its SS's and 100% again to receiving from the first tier RS's, the first tier RS's may only need a fraction of the available sub-channels to receive from the second tier RS's, which may need even fewer sub-channels to receive from the third tier RS's, etc., so the principle of FFR may again be applied to reduce the number of sub-channels needed by the outer tiers.

If the volume of uplink data to be received from the SS's and RS's at each level can be predicted, sub-channels for this purpose may be assigned in a most efficient manner. However, unlike the downlink traffic, which is known by the NC (the NC should know in advance how much data it is sending to each device), the volume of uplink traffic may or may not be fully known. If the level of uplink traffic is not known, or is not known far enough in advance to be helpful, it may be estimated based on various criteria, such as but not limited to assuming that impending traffic levels at each tier or device will be similar to recent traffic levels.

In some embodiments, the NC may assign which sub-channels will be available for downlink communications between adjacent tiers, and each RS may then decide how to allocate those sub-channels between its associated SS's and RS's. In other embodiments, the NC may allocate all sub-channels between SS's and RS's at every tier.

Figure 5:
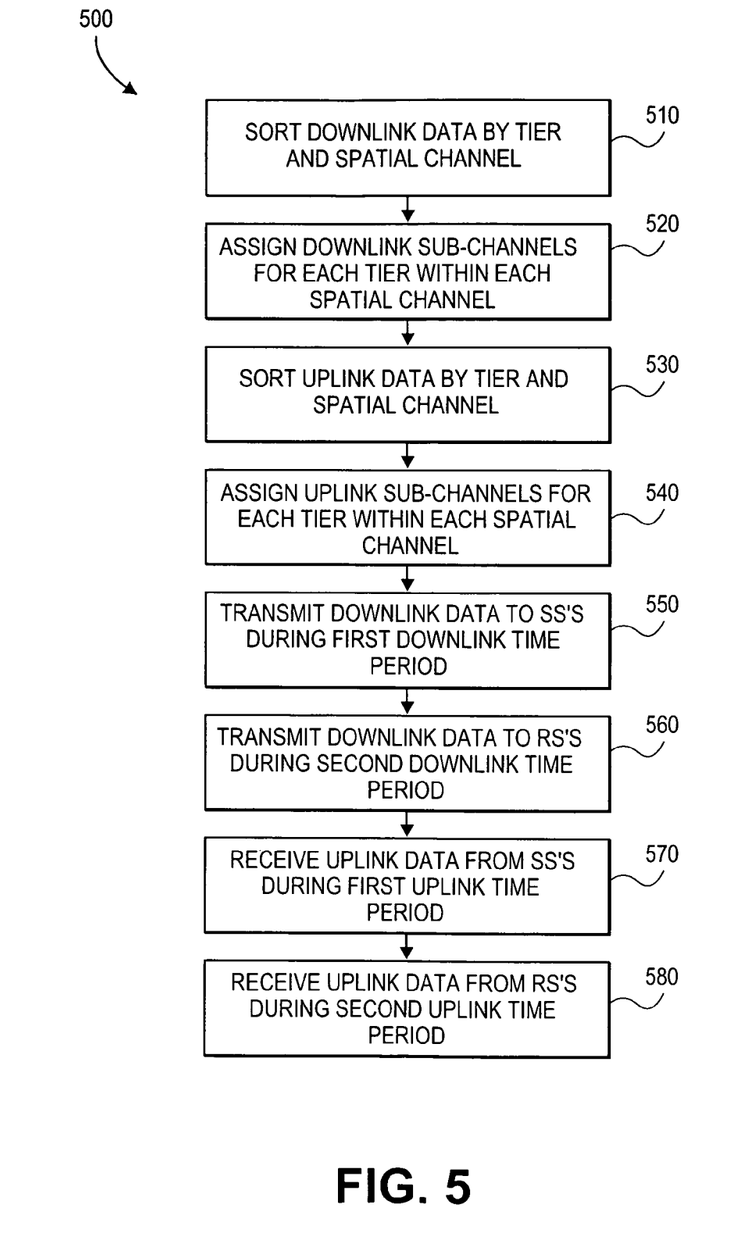
FIG. 5 shows a flow diagram of a method of communicating by a network controller, according to an embodiment of the invention.

FIG. 5 shows a flow diagram of a method of communicating by a network controller, according to an embodiment of the invention. The illustrated method includes both downlink and uplink processes, although either could be described individually. In flow diagram 500, at 510 the NC may examine the data it has for downlink transmission, and sort this data by which spatial channel it will be transmitted on (e.g., to RS-1 or RS-2 in FIG. 3). Since all the devices that are downstream from a particular first-tier RS must communicate with the NC indirectly through that particular RS, the NC may need to know which devices are downstream from each first-tier RS so it can sort the data accordingly. In some embodiments the NC may also know the entire network structure (i.e., which devices are downstream from which devices) so that it can schedule all the communications between these devices.

In some embodiments, some of the data to be transmitted from the NC may not be transmitted on any of the spatial channels intended for direct communication with first-tier RS's (e.g., it may be transmitted omnidirectionally, or may be transmitted directly to some SS's through other spatial channels), but those considerations are not described here.

After determining which data should be transmitted over which spatial channels, at 520 the NC may also decide which sub-channels to use for its downlink transmissions to the first-tier RS's. For simplicity, the examples of FIGS. 3 and 4 assumed all of the available sub-channels would be used, but some operations may use less than all the sub-channels. In some embodiments, the NC may also determine which sub-channels will later be used by each RS at each tier, and/or how those sub-channels will be allocated between SS and RS traffic. Each of these numbers may be the same or different between the different spatial channels.

At 530 and 540, the NC may perform the same analysis for uplink data as it did for downlink data at 510 and 520. Then at 550, downlink data may be transmitted during the first downlink time period to the SS's that are directly associated with the NC (rather than being indirectly associated through an RS). At 560, downlink data may be transmitted to the first-tier RS's during the second downlink time period. In some embodiments, part of the downlink data will include a downlink map describing when, and over which sub-channels, each device is to receive it's particular downlink data. It may also include an uplink map describing the same parameters for uplink data for each device.

After the downlink portion of the communication is over, the NC may receive uplink data. At 570 it may receive uplink data from its directly-associated SS's during the first uplink time period, and at 580 it may receive uplink data from the first-tier RS's during the second uplink time period. In subsequent frames, the operations of FIG. 5 may be repeated, creating a continual flow of downlink and uplink data in the network. The various parameters in this process that are specified by the NC may be dynamically changed each time to suit the data flow needs of the network.

Figure 6:
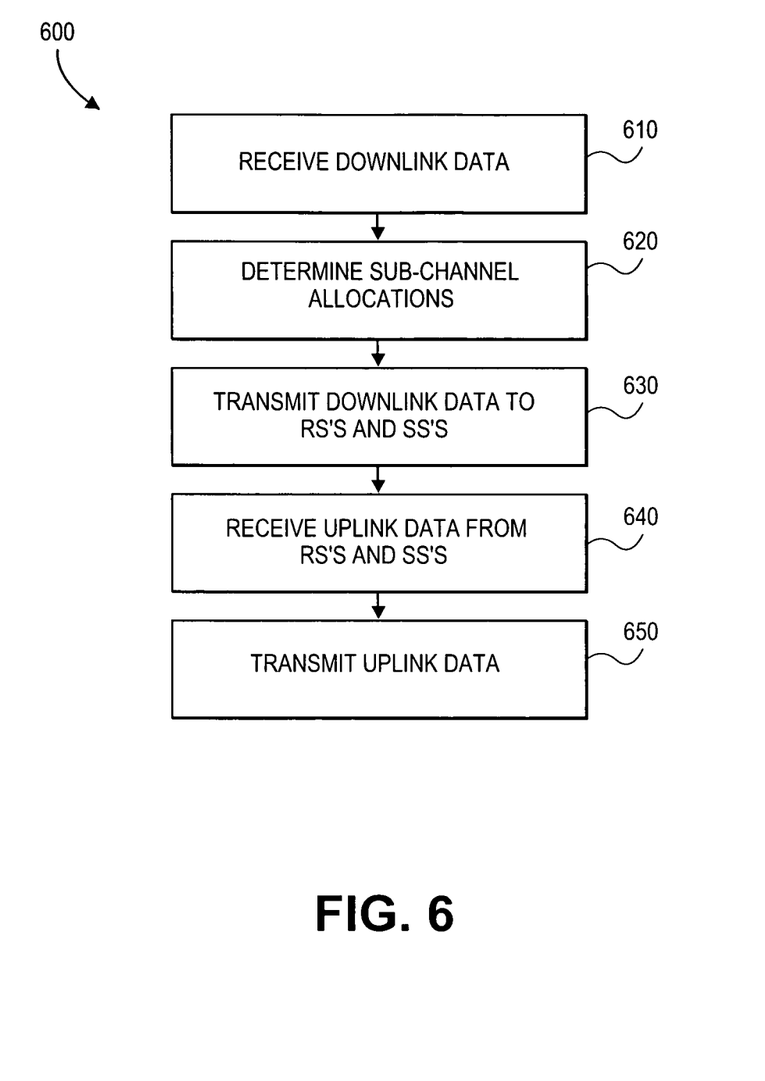
FIG. 6 shows a flow diagram of a method of communicating by a relay station, according to an embodiment of the invention.

FIG. 6 shows a flow diagram of a method of communicating by a relay station, according to an embodiment of the invention. This might be an RS at any tier. In flow diagram 600, at 610 the RS may receive downlink data during a downlink frame, either from the NC or from an upstream RS. This downlink data may include data destined for SS's directly associated with this RS, and/or data destined for downstream RS's, and/or data destined for downstream SS's associated with the downstream RS's. The received downlink data may also include data destined for this RS, data that is not to be passed on to other devices.

At 620 this RS may determine which sub-channels are to be used for transmitting received downstream data to RS's and which sub-channels are to be used for transmitting received downstream data to SS's. This decision may be made by this RS based on the intended destinations of the current downlink data, or the decisions may have already been made by the NC and the results of those decisions are merely received by this RS in the received downlink data.

At 630, this RS may transmit the proper downlink data to downstream RS's and SS's. In some embodiments, this transmitted downlink data may include information on which sub-channels the downstream RS's are to allocate to the SS's and RS's they transmit to, while in other embodiments the downstream RS's are to make this determination themselves based on the destination addresses of that data.

In the downlink frame, this RS may receive the downlink data at 610 during a first time period, and transmit downlink data at 630 during a second time period, as described for FIG. 3. The terms 'first' and 'second', in this case, are merely used to distinguish the two time periods, but do not imply the temporal order in which these two events occur within the frame.

In a subsequent uplink frame, at 640 this RS may receive uplink data from the downstream RS's and SS's that are directly associated with it. The sub-channels used by these downstream RS's and SS's may have been previously assigned, and may represent only a portion of the available sub-channels, in keeping with the principles of fractional frequency reuse described earlier for the downlink frame. At 650, this RS may transmit uplink data to its upstream RS (or to the NC if there is no upstream RS). As was the case with downstream data, the receipt of uplink data and the transmission of uplink data may occur during two different time periods during the uplink frame. Which time period is for receiving and which is for transmitting may depend on whether the RS is an even or odd RS, based on its tier.

By alternating two time periods in the downlink frames in the described manner at each level, only two time periods may be needed to service a much larger number of tiers, with every device in every tier being eligible to either transmit or receive in every time period. A similar technique may be applied in reverse to the uplink frames. This alternating time period approach, at alternating tiers of relay stations, allows the efficiencies of the technique to be scaled up to a large number of tiers without any fundamental changes. When combined with the technique of transmitting to (or receiving from) SS's and RS's in parallel using different sets of sub-channels, a network can efficiently accommodate a large number of devices at various tiers, including any feasible number of first tier RS's, any feasible number of spatial channels to communicate between the NC and first tier RS's, any feasible number of tiers of RS's, any feasible number of downstream RS's communicating with a single upstream RS, and any feasible number of SS's communicating with a single RS or with the NC. Fractional frequency reuse may also be employed to further improve efficiency of the network.

The foregoing description is intended to be illustrative and not limiting. Variations will occur to those of skill in the art. Those variations are intended to be included in the various embodiments of the invention, which are limited only by the scope of the following claims.

What is claimed is:

1. A method, comprising:
making a first transmission, during a first time period in a downlink frame, from a network controller to a subscriber station; and
making a second transmission, during a second time period in the downlink frame, from the network controller to a first relay station over a first spatial channel and simultaneously making a third transmission from the network controller to a second relay station over a second spatial channel, wherein the first and second spatial channels use the same frequencies, wherein information in the second transmission indicates a first set of sub-channels the first relay station is to use to communicate with subscriber stations and a second set of sub-channels the first relay station is to use to communicate with other relay stations downstream from the first relay station, wherein the first set includes no sub-channels in the second set.

2. The method of claim 1, further comprising:
making a first reception, during a third time period in an uplink frame, of a fourth transmission from the subscriber station; and
making a second reception, during a fourth time period in the uplink frame, of a fifth transmission from the first relay station over the first spatial channel and simultaneously making a third reception of a sixth transmission from the second relay station over the second spatial channel.

3. The method of claim 2, wherein the second transmission includes information on sub-channels to be used during the second reception.

4. The method of claim 1, further comprising sorting downlink data by tier and spatial channel prior to said making the second transmission.

5. An apparatus, comprising
a network controller to be used to communicate directly with first and second relay stations in a wireless communications network, the network controller able to communicate simultaneously over first and second spatial channels, the network controller to:
make a first transmission, during a first time period in a downlink frame, to a subscriber station; and
make a second transmission, during a second time period in the downlink frame, to a first relay station over a first spatial channel and simultaneously make a third transmission to a second relay station over a second spatial channel, wherein the first and second spatial channels use the same frequencies,
wherein information in the second transmission indicates a first set of sub-channels the first relay station is to use to communicate with subscriber stations and a second set of sub-channels the first relay station is to use to communicate with other relay stations downstream from the first relay station, wherein the first set includes no sub-channels in the second set.

6. The apparatus of claim 5, wherein the network controller is further configured to:
make a first reception, during a third time period in an uplink frame, of a fourth transmission from the subscriber station; and
make a second reception, during a fourth time period in the uplink frame, of a fifth transmission from the first relay station over the first spatial channel and simultaneously make a third reception of a sixth transmission from the second relay station over the second spatial channel.

7. The apparatus of claim 6, wherein the second transmission includes information on sub-channels to be used during the second reception.

8. The apparatus of claim 5, wherein the network controller is further configured to:
sort downlink data by tier and spatial channel prior to said making the second transmission.

9. An article comprising
a non-transitory computer-readable storage medium that contains instructions, which when executed by one or more processors result in performing operations comprising:
making a first transmission, during a first time period in a downlink frame, from a network controller to a subscriber station; and
making a second transmission, during a second time period in the downlink frame, from the network controller to a first relay station over a first spatial channel and simultaneously making a third transmission from the network controller to a second relay station over a second spatial channel, wherein the first and second spatial channels use the same frequencies, wherein information in the second transmission indicates a first set of sub-channels the first relay station is to use to communicate with subscriber stations and a second set of sub-channels the first relay station is to use to communicate with other relay stations downstream from the first relay station, wherein the first set includes no sub-channels in the second set.

10. The article of claim 9, wherein the operations further comprise:
   making a first reception, during a third time period in an uplink frame, of a fourth transmission from the subscriber station; and
   making a second reception, during a fourth time period in the uplink frame, of a fifth transmission from the first relay station over the first spatial channel and simultaneously making a third reception of a sixth transmission from the second relay station over the second spatial channel.

11. The article of claim 10, wherein the second transmission includes information on sub-channels to be used during the second reception.

12. The article of claim 9, wherein the operations further comprise sorting downlink data by tier and spatial channel prior to said making the second transmission.

* * * * *